(12) United States Patent
Barnes et al.

(10) Patent No.: US 11,927,118 B2
(45) Date of Patent: Mar. 12, 2024

(54) REMOTELY MOUNTED IDLER GEAR

(71) Applicant: Cummins Inc., Columbus, IN (US)

(72) Inventors: David M. Barnes, Columbus, IN (US); Kevin C. Augustin, Sr., Greenwood, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/104,498

(22) Filed: Feb. 1, 2023

(65) Prior Publication Data

US 2023/0175419 A1 Jun. 8, 2023

Related U.S. Application Data

(63) Continuation of application No. 16/771,086, filed as application No. PCT/US2017/066099 on Dec. 13, 2017, now Pat. No. 11,591,937.

(51) Int. Cl.
*F01L 1/02* (2006.01)
*F01L 1/20* (2006.01)
*F16H 57/12* (2006.01)

(52) U.S. Cl.
CPC .............. *F01L 1/026* (2013.01); *F01L 1/20* (2013.01); *F16H 57/12* (2013.01); *F16H 2057/125* (2013.01)

(58) Field of Classification Search
CPC .. F01L 1/026; F01L 1/20; F16H 57/12; F16H 2057/125
See application file for complete search history.

(56) References Cited

U.S. PATENT DOCUMENTS

| | | | | |
|---|---|---|---|---|
| 3,502,059 A | * | 3/1970 | Davis | ............... F16H 57/022 |
| | | | | 123/90.15 |
| 4,155,267 A | * | 5/1979 | Notestine | ............... F16H 3/22 |
| | | | | 74/342 |
| 4,951,623 A | * | 8/1990 | Jingu | ............... F01L 1/022 |
| | | | | 123/193.5 |

(Continued)

FOREIGN PATENT DOCUMENTS

| CN | 1500983 A | 6/2004 |
|---|---|---|
| CN | 200961494 Y | 10/2007 |

(Continued)

OTHER PUBLICATIONS

International Search Report and Written Opinion issued by the ISA/US, Commissioner for Patents, dated Mar. 7, 2018, for International Application No. PCT/US2017/066099; 8 pages.

*Primary Examiner* — Kurt Philip Liethen
(74) *Attorney, Agent, or Firm* — Faegre Drinker Biddle & Reath LLP

(57) ABSTRACT

The present disclosure provides a remote mount for an idler gear assembly, comprising: a gear mounting plate including a plurality of bores configured to receive a corresponding plurality of fasteners to mount a gear assembly to the gear mounting plate; and an attachment bracket including a plurality of mounting openings configured to receive a corresponding plurality of bolts to mount the remote mount to a cylinder head. The gear mounting plate supports the gear assembly such that a gear of the gear assembly rotates about an axis that is parallel to an axis of a crankshaft of an engine and the attachment bracket mounts to an upper surface of the cylinder head.

20 Claims, 9 Drawing Sheets

(56) References Cited

U.S. PATENT DOCUMENTS

| | | | |
|---|---|---|---|
| 4,955,335 A * | 9/1990 | Jingu | F01L 1/02 |
| | | | 123/90.31 |
| 4,970,999 A | 11/1990 | Jingu et al. | |
| 4,974,561 A | 12/1990 | Murasaki et al. | |
| 5,107,802 A * | 4/1992 | Yagi | F01L 13/0063 |
| | | | 123/90.31 |
| 5,540,112 A | 7/1996 | Baker et al. | |
| 5,870,928 A | 2/1999 | Genter et al. | |
| 6,213,072 B1 | 4/2001 | Sayama et al. | |
| 6,293,166 B1 | 9/2001 | Genter et al. | |
| 6,293,244 B1 * | 9/2001 | Mullins | F01M 1/16 |
| | | | 123/196 R |
| 8,915,162 B2 * | 12/2014 | Murphy | F16H 55/17 |
| | | | 123/196 R |
| 9,057,399 B2 * | 6/2015 | Bell | F02B 67/04 |
| 10,655,508 B1 * | 5/2020 | Patel | F01L 1/026 |
| 2004/0103871 A1 | 6/2004 | Tsutsumi et al. | |
| 2010/0071646 A1 | 3/2010 | Kono et al. | |
| 2011/0005500 A1 | 1/2011 | Asari et al. | |
| 2012/0298068 A1 * | 11/2012 | LaGatta | F01M 1/02 |
| | | | 417/364 |
| 2013/0206121 A1 | 8/2013 | Nishikawa | |
| 2015/0176698 A1 * | 6/2015 | Vandewal | F16H 57/022 |
| | | | 29/893.2 |
| 2017/0016514 A1 | 1/2017 | Jones | |
| 2017/0122252 A1 | 5/2017 | Schmid et al. | |
| 2018/0080352 A1 * | 3/2018 | Patel | F16H 57/043 |
| 2021/0189914 A1 | 6/2021 | Barnes et al. | |

FOREIGN PATENT DOCUMENTS

| | | | |
|---|---|---|---|
| CN | 101203671 A | | 6/2008 |
| CN | 101813177 A | | 8/2010 |
| CN | 102869872 A | | 1/2013 |
| CN | 103422927 A | | 12/2013 |
| CN | 106164421 A | | 11/2016 |
| CN | 206205993 U | * | 5/2017 |
| CN | 206205993 U | | 5/2017 |
| EP | 2159454 A1 | | 3/2010 |
| KR | 10-0736974 B1 | | 7/2007 |
| WO | 03/78801 A1 | | 9/2003 |

* cited by examiner

REMOTELY MOUNTED IDLER GEAR

CROSS-REFERENCE TO RELATED APPLICATIONS

The present invention claims priority to U.S. patent application Ser. No. 16/771,086, entitled "REMOTELY MOUNTED IDLER GEAR," filed on Jun. 9, 2020, which claims priority to a national phase filing of PCT/US2017/066099, filed on Dec. 13, 2017, the complete disclosures of which are expressly incorporated by reference herein.

TECHNICAL FIELD

The present invention relates generally to idler gears and more particularly to remote mount for an idler gear that mounts to a cylinder head at a surface that is perpendicular to the axis of rotation of the idler gear.

BACKGROUND

Idler gears are known, and in certain applications are used to provide a desired speed ratio between a crankshaft gear and a camshaft gear. Typically, such idler gears are mounted directly to a cylinder block using fasteners that pass through the idler gear assembly parallel to the axis of rotation of the idler gear into the cylinder block. In certain applications, however, access to the fasteners in this mounting configuration is limited. Moreover, in certain applications, the required location for the idler gear does not permit mounting it a vertical surface of the cylinder block or the cylinder head. In such applications, a portion of the idler gear is positioned above the cylinder block, and no vertical surface is available for receiving mounting fasteners. As such, a need exists for a remotely mounted idler gear that attaches to a horizontal surface of the cylinder head while simultaneously positioning the idler gear in a vertical orientation.

SUMMARY

In one embodiment, the present disclosure provides a remote mount idler gear assembly, comprising: a gear assembly including a gear; and a remote mount including a gear mounting plate and an attachment bracket, the gear mounting plate including a plurality of bores configured to receive a corresponding plurality of fasteners to mount the gear assembly to the gear mounting plate, the attachment bracket including a plurality of mounting openings configured to receive a corresponding plurality of bolts to mount the remote mount to a cylinder head; wherein the gear mounting plate supports the gear assembly for rotation of the gear about an axis that is parallel to an axis of a crankshaft of an engine and the attachment bracket mounts to an upper surface of the cylinder head. In one aspect of this embodiment, the gear mounting plate includes an inner surface into which the plurality of bores extend and the attachment bracket includes a lower surface that engages the upper surface of the cylinder head when the remote mount is mounted to the cylinder head, the inner surface being substantially perpendicular to the lower surface. In another aspect, the gear mounting plate includes a drain bore in flow communication with a slot of the attachment bracket, the drain bore being positioned to receive oil from a breather system when the remote mount is mounted to the cylinder head. In a variant of this aspect, the slot is formed in a lower surface of the attachment bracket and configured to align with a drain opening in the cylinder head. In yet another aspect of this embodiment, the gear mounting plate includes an inner surface having a slot in communication with a first drilling that extends through the gear mounting plate, and the remote mount includes a second drilling that extends into the remote mount from a lower surface of the remote mount and is in flow communication with the first drilling, wherein the first drilling, the second drilling and the slot providing a path for oil to flow from the cylinder head to the gear assembly. In still another aspect, the attachment bracket includes a plurality of holes sized to receive pins extending from the cylinder head to control the position of the remote mount on the cylinder head. In another aspect, the gear mounting plate includes an upper surface that aligns with at least one timing mark on the gear to indicate a desired position of the gear. In still another aspect of this embodiment, the gear assembly further includes a hub that supports the gear for rotation, the hub including a plurality of openings that are aligned with the plurality of bores in the gear mounting plate and sized to receive the corresponding plurality of fasteners with clearance, the clearance permitting adjustment of the position of the gear assembly on the gear mounting plate to achieve a desired lash between the gear and an adjacent gear. In a variant of this aspect, the hub further includes a threaded opening to receive a lash adjustment bolt, the lash adjustment bolt providing a leverage point for a tool urge the gear assembly in an adjustment direction during adjustment of the position of the gear assembly on the gear mounting plate to achieve a desired lash.

In another embodiment of the present disclosure, a remote mount for an idler gear assembly is provided, comprising: a gear mounting plate including a plurality of bores configured to receive a corresponding plurality of fasteners to mount a gear assembly to the gear mounting plate; and an attachment bracket including a plurality of mounting openings configured to receive a corresponding plurality of bolts to mount the remote mount to a cylinder head; wherein the gear mounting plate supports the gear assembly such that a gear of the gear assembly rotates about an axis that is parallel to an axis of a crankshaft of an engine and the attachment bracket mounts to an upper surface of the cylinder head. In one aspect of this embodiment, the gear mounting plate includes an inner surface into which the plurality of bores extend and the attachment bracket includes a lower surface that engages the upper surface of the cylinder head, the inner surface being substantially perpendicular to the lower surface. In another aspect, the gear mounting plate includes a drain bore in flow communication with a slot of the attachment bracket, the drain bore being positioned to receive oil from a breather system when the remote mount is mounted to the cylinder head. In a variant of this aspect, the slot is formed in a lower surface of the attachment bracket and configured to align with a drain opening in the cylinder head. In still another aspect, the gear mounting plate includes an inner surface having a slot in communication with a first drilling that extends through the gear mounting plate, and the remote mount includes a second drilling that extends into the remote mount from a lower surface of the remote mount and is in flow communication with the first drilling, wherein the first drilling, the second drilling and the slot providing a path for oil to flow from the cylinder head to the gear assembly. In another aspect, the attachment bracket includes a plurality of holes sized to receive pins extending from the cylinder head to control the position of the remote mount on the cylinder head. In yet another aspect of this embodiment, the gear mounting plate includes an upper surface that aligns with at least one timing mark on the gear to indicate a desired position of the gear.

In yet another embodiment, the present disclosure provides a method of installing an idler gear assembly onto an engine, comprising: assembling the idler gear assembly; mounting the idler gear assembly to a gear mounting plate of a remote mount using a plurality of fasteners; bolting an attachment bracket of the remote mount to an upper surface of a cylinder head of the engine, thereby positioning the idler gear assembly such that a gear of the idler gear assembly rotates about an axis that is parallel to an axis of a crankshaft of the engine; adjusting the lash of the idler gear assembly; and tightening the plurality of fasteners to secure the idler gear assembly to the gear mounting plate. In one aspect of this embodiment, the lash of the idler gear assembly includes positioning a tool between a shoulder of the cylinder head and a scalloped surface of a lash adjustment bolt attached to a hub of the idler gear assembly and applying a force to the tool to urge the idler gear assembly into engagement with an adjacent gear. A variant of this aspect further includes maintaining the force while tightening a first fastener of the plurality of fasteners. In another aspect, mounting the idler gear assembly to the gear mounting plate of the remote mount includes rotating the gear until at least one timing mark on the gear aligns with an upper surface of the gear mounting plate.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

DETAILED DESCRIPTION

The embodiments disclosed below are not intended to be exhaustive or to limit the invention to the precise forms disclosed in the following detailed description. Rather, the embodiments are chosen and described so that others skilled in the art may utilize their teachings.

Figure 1:
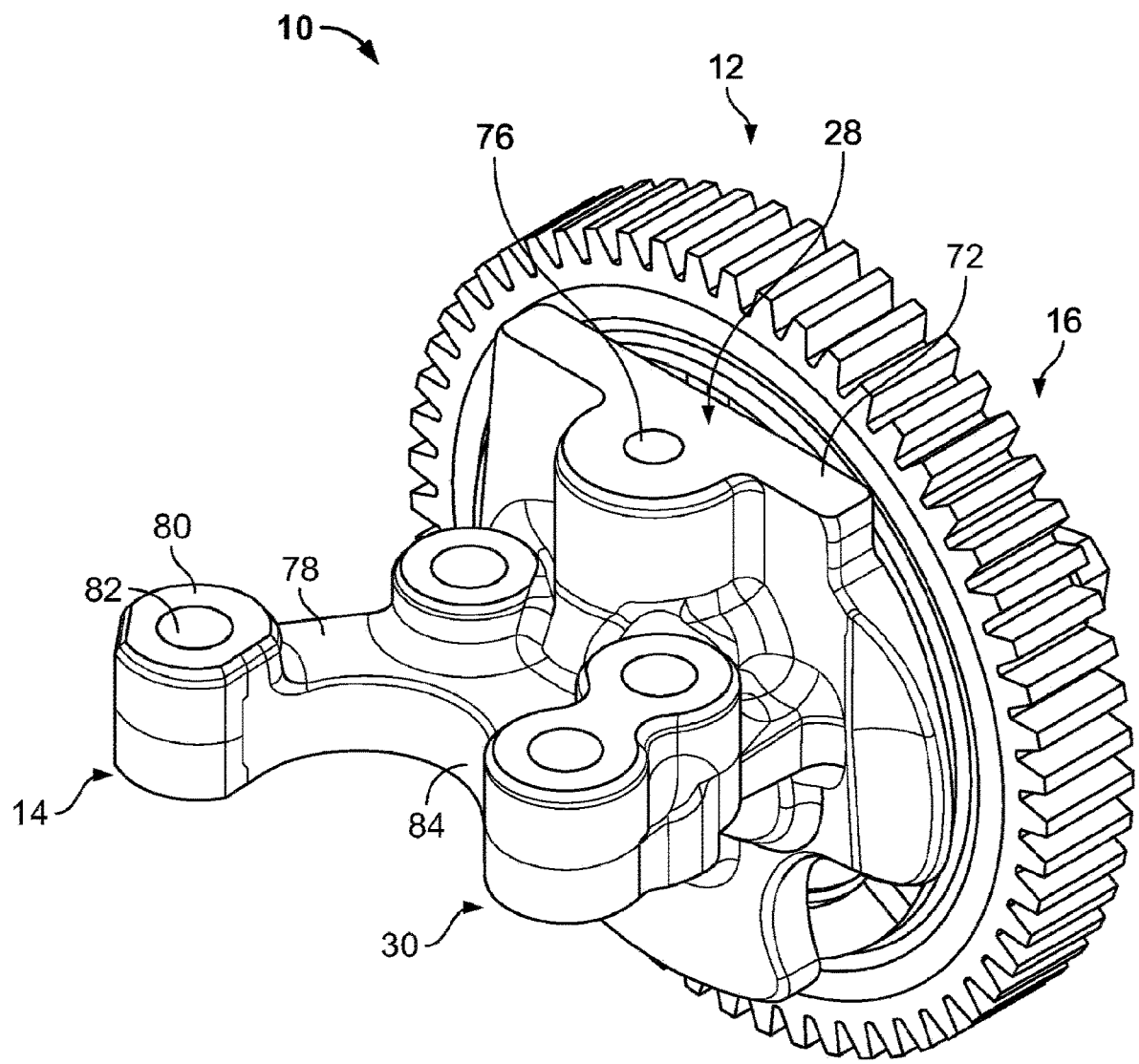
FIG. 1 is a perspective view of a remote mount idler gear assembly according to one embodiment of the present disclosure.
Figure 2:
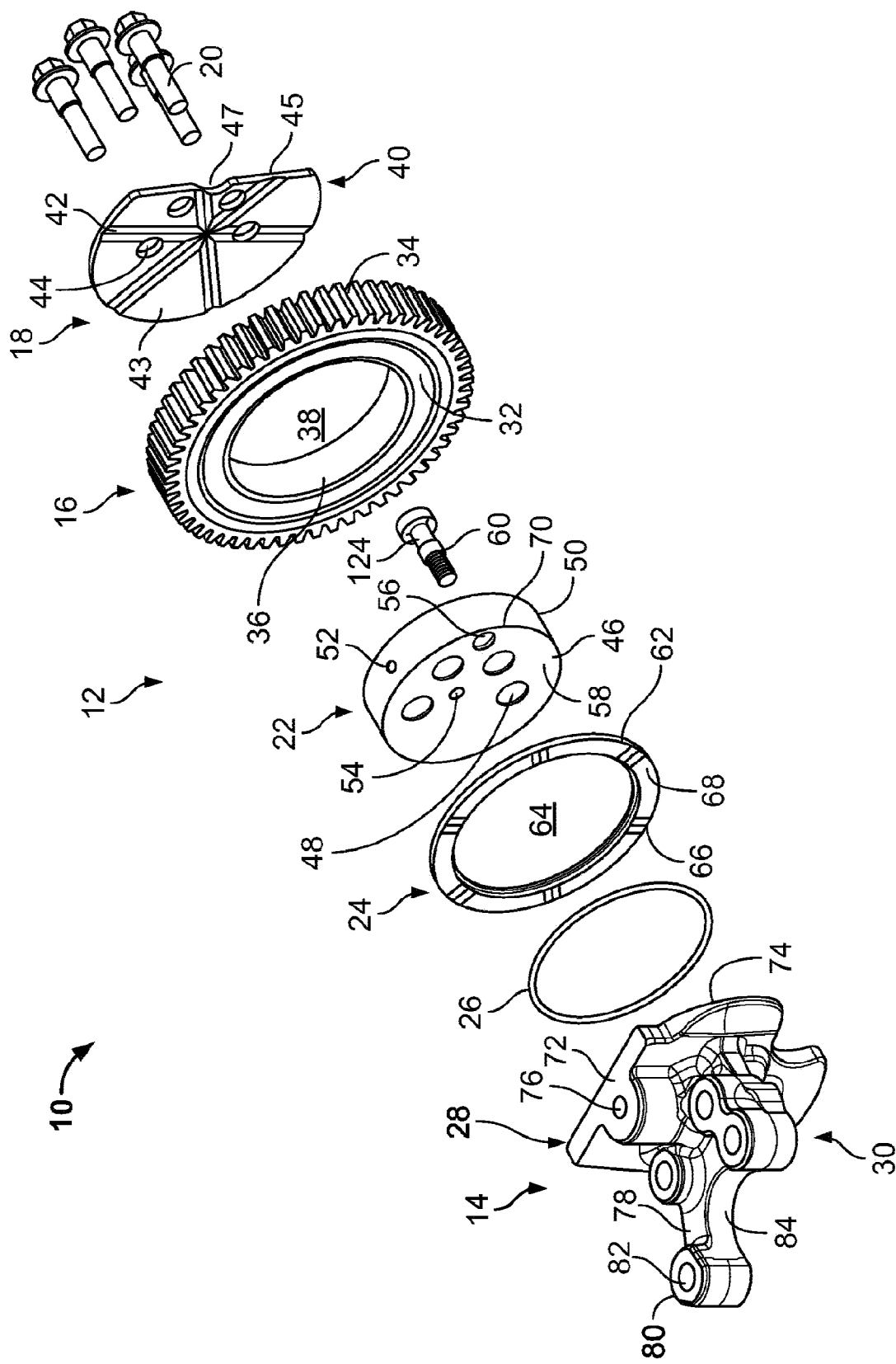
FIG. 2 is an exploded perspective view of the idler gear assembly of FIG. 1.

Referring now to FIGS. 1 and 2, a remote mount idler gear assembly 10 according to one embodiment of the present disclosure is shown. Idler gear assembly generally includes a gear assembly 12 and a remote mount 14. As best shown in FIG. 2, gear assembly 12 generally includes a gear 16, a thrust plate 18, hub fasteners a gear hub 22, a thrust bearing 24 and a retention ring 26. Remote mount 14 generally includes a gear mounting plate 28 and an attachment bracket 30. In one embodiment of the present disclosure, mounting plate 28 and attachment bracket 30 are one piece.

Gear 16 includes a generally circular body 32 having a plurality of teeth 34 about its circumference. Body 32 further includes an inner press bushing 36 defining a central opening 38 and providing a wear surface for hub 22 as gear 16 rotates on hub 22. In one embodiment, bushing 36 is made of brass. While four fasteners 20 are depicted as being used to connect gear assembly 12 to remote mount 14 in this embodiment, it should be understood that in other embodiments, more or fewer fasteners may be used.

Thrust plate 18 includes a generally disc shaped body 40 having a plurality of grooves or ramps 42 extending across the diameter of body 40 and intersecting at the center of body 40. As is further described below, ramps 42 distribute oil to the inner surface or pads 43 of body 40. Thrust plate 18 further includes a plurality of openings 44 configured to receive fasteners 20. As shown in FIG. 2, thrust plate 18 includes a flat edge 45 having a cutout 47 which provides clearance for a lash adjustment bolt 60 described below.

Gear hub 22 includes a generally disc shaped body 46 having a diameter that is sized to fit within central opening 38 of gear 16. Gear hub 22 further includes a plurality of openings 48 extending through body 46 and spaced to correspond to the spacing of openings 44 on thrust plate 18 to permit fasteners 20 to extend through body 46. Openings 44 receive fasteners 20 with sufficient clearance to permit lash adjustment as described below. Gear hub 22 also includes an annular surface 50 that interfaces with bushing 36 and has at least one drilling 52 extending into surface 50 and body 46. Drilling 52 is in flow communication with drilling 54 which extends into an inner surface 58 of body 46 to communicate oil from mount 14 to annular surface 50 and bushing 36 as is further described below. A partially threaded opening 56 is formed into body 46 to receive lash adjustment bolt 60.

Thrust bearing 24 includes a generally ring shaped body 62 having a central opening 64 and a plurality of grooves or ramps 66 extending across an inner surface 68 of body 62. Ramps 66 distribute oil across inner surface 68. Retention ring 26 is sized to fit within an annular groove 70 formed about gear hub body 46 at the interface between inner surface 58 and annular surface 50. In this manner, retention ring 26 holds the entire gear assembly 12 together for mounting to remote mount 14 during assembly.

As indicated above, remote mount 14 generally includes gear mounting plate 28 and attachment bracket 30. Mounting plate 28 includes an upper surface 72 and an inner surface 74. A drain bore 76 is formed into mounting plate 28 through upper surface 72. Attachment bracket 30 generally includes a body 78 having a plurality of mounting bosses 80, each having a mounting opening 82 formed there through. Attachment bracket 30 further includes a cutout 84 which provides clearance around a valve spring when remote mount idler gear assembly 10 is mounted to an engine as is further described herein.

Figure 3:
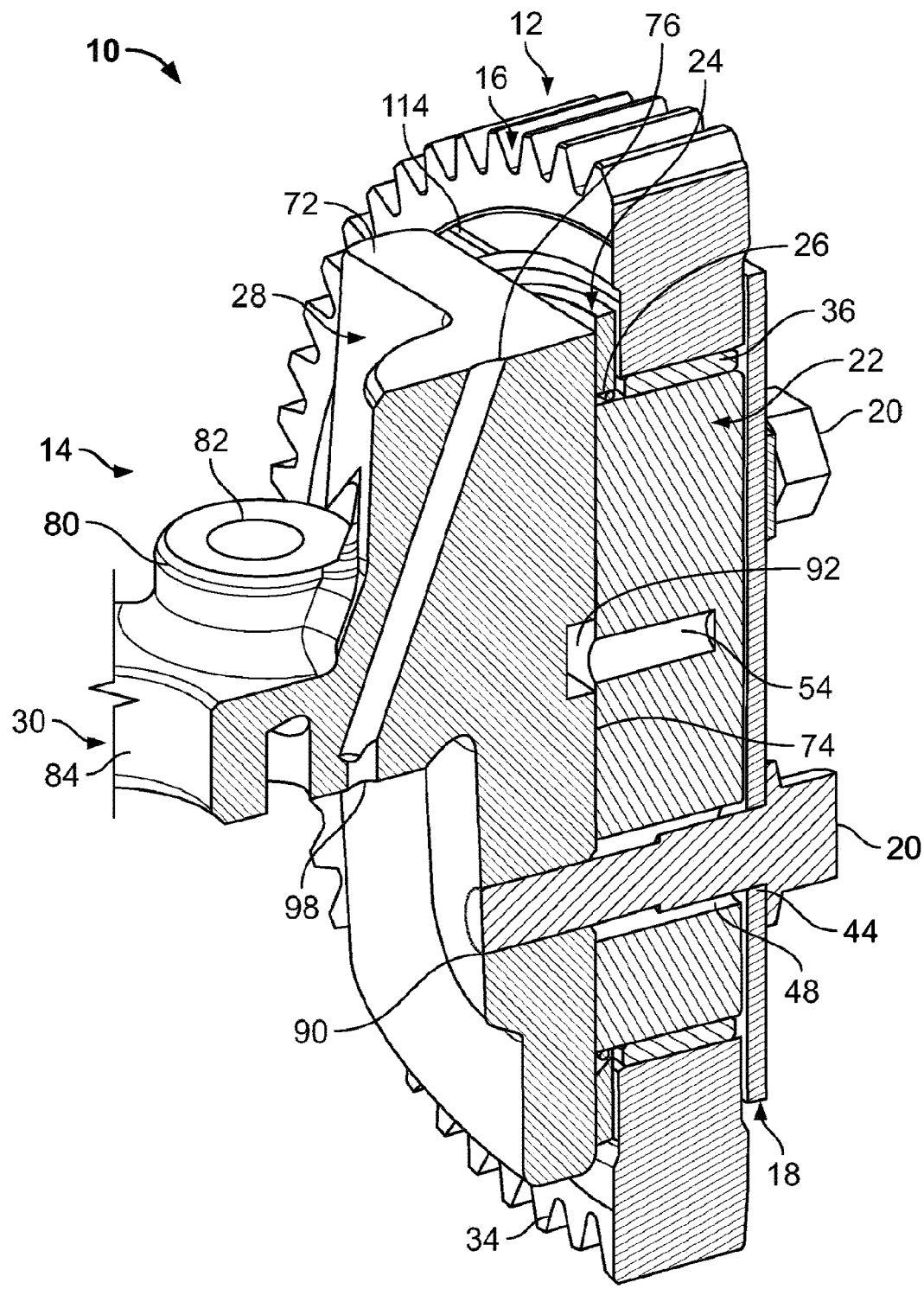
FIG. 3 is a cross-sectional view of the idler gear assembly of FIG. 1.

Referring now to FIG. 3, gear assembly 12 is shown mounted to remote mount 14. As shown, drain bore 76 extends through mounting plate 28 to a slot 98 formed in attachment bracket 30. In certain applications, a breather system (not shown) is mounted above assembly 10 which dumps oil from blowby gases for routing to an oil pan (not shown). Specifically, the oil flows into drain bore 76 and out slot 98, which is aligned with a drain opening formed in a cylinder head 102 to which assembly 10 is mounted. As is also shown in FIG. 3, gear assembly 12 is mounted to remote mount 14 using fasteners 20 which extend through openings 44 of thrust plate 18, openings 48 of gear hub 22, and into threaded bores 90 of mounting plate 28. FIG. 3 further shows an oil slot 92 formed into inner surface 74 of mounting plate 28 for delivery of oil to drilling 54 in hub 22 as is further described below.

Figure 4:
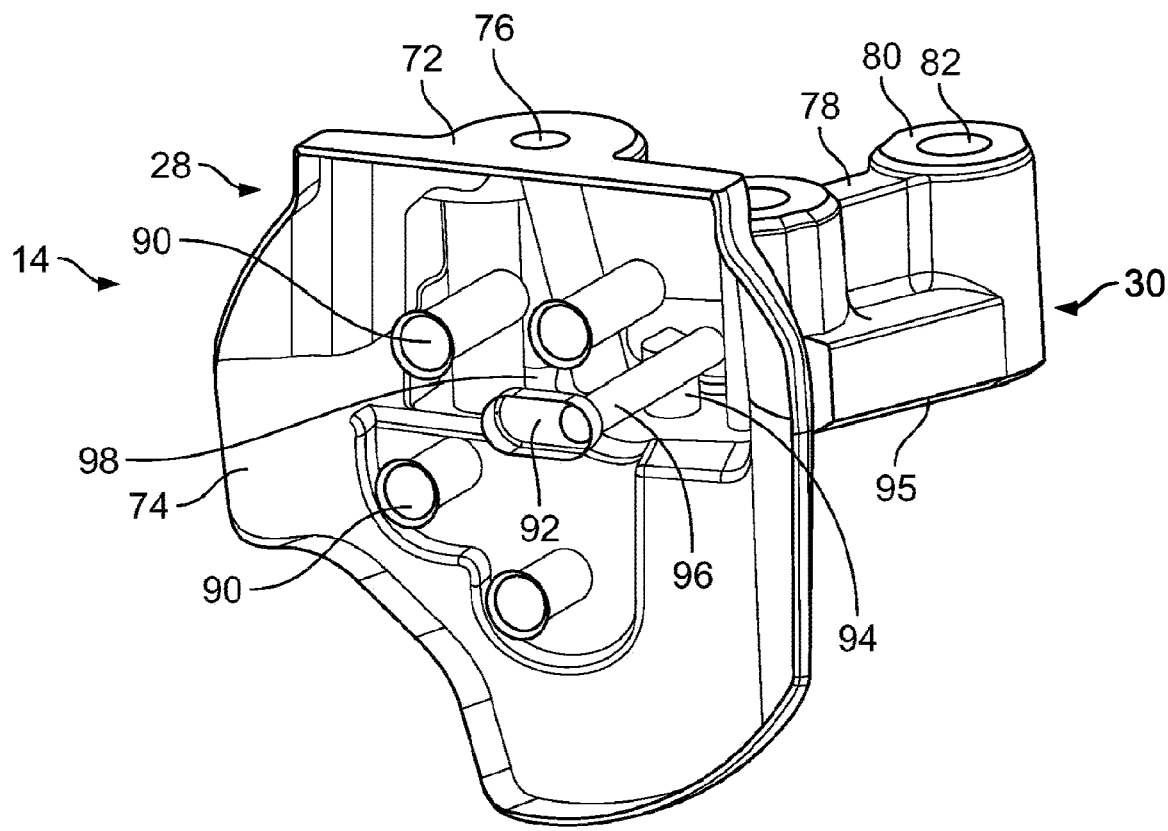
FIG. 4 is a partially transparent perspective view of a remote mount of the idler gear assembly of FIG. 1.

Referring now to FIG. 4, slot 92 is shown on inner surface 74. Slot 92 is sized and positioned to permit movement of gear assembly 12 relative to remote mount 14 during lash adjustment (as described below) but still provide full delivery of oil to drilling 54 of hub 22. Oil is routed from the engine cylinder head 102 into drilling 94 formed into the lower surface 95 of attachment bracket 30 (see also FIG. 5). Drilling 94 is in flow communication with drilling 96, which delivers the oil from drilling 94 to slot 92. Thus, drilling 94, drilling 96 and slot 92 provide a path for oil to flow from cylinder head 102 to gear assembly 12.

Figure 5:
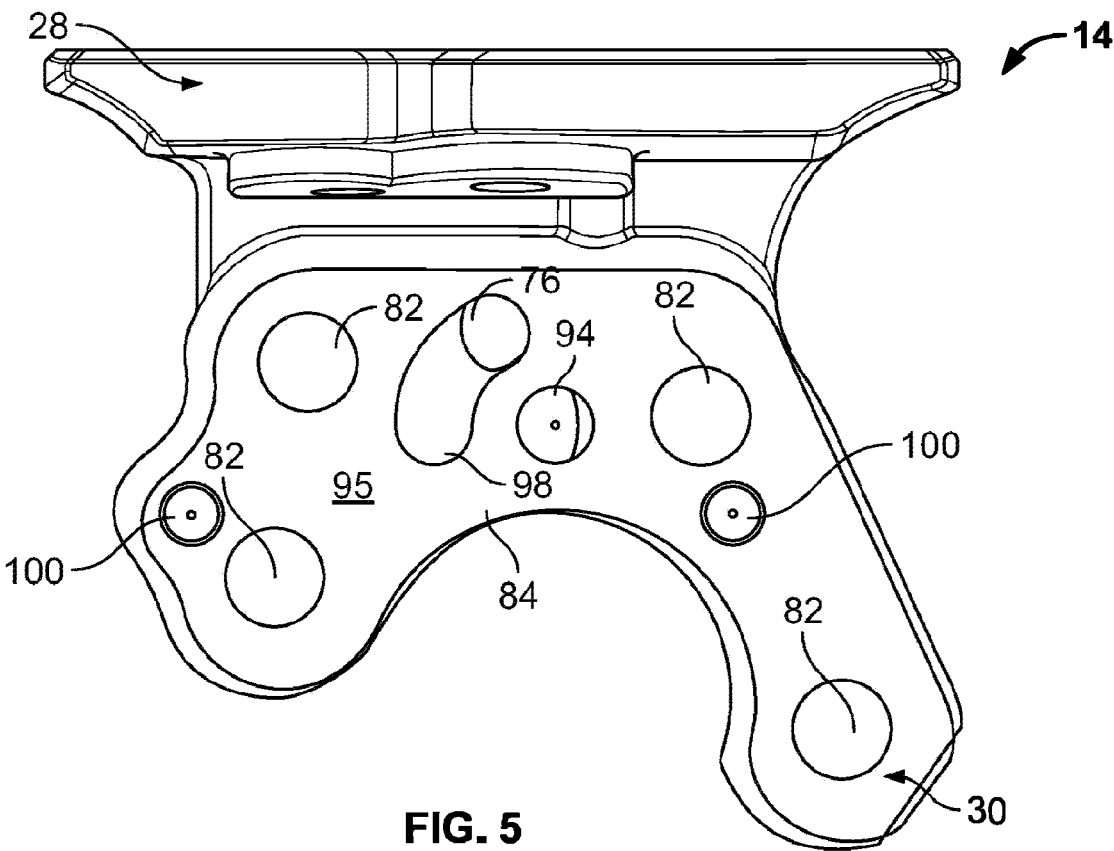
FIG. 5 is a bottom plan view of the remote mount of FIG. 4.

FIG. 4 also shows drain bore 76 extending into mounting plate 28. Drain bore 76 terminates at a slot 98 formed in lower surface 95 of attachment bracket 30. As best seen in FIG. 5, slot 98 is shaped to align with a drain opening into the cylinder head 102 to drain oil from the breather system.

FIG. 5 also shows dowel pin holes 100 formed into lower surface 95 of attachment bracket 30. Mounting openings 82 are sized to receive fasteners such as bolts 97 (FIG. 6) for attaching remote mount 14 to the cylinder head 102. The clearance required for mounting openings 82 to receive the fasteners does not result in sufficiently precise mounting to cylinder head 102. Dowel pin holes 100 have an inner diameter that is precisely sized to receive dowel pins (not shown) extending from the mounting surface of cylinder head 102. The dowel pins are precisely located and the precise alignment with dowel pin holes 100 permits holes 100 to control the position of remote mount 14 on cylinder head 102. It should be understood that other alignment structures could be used in other embodiments. For example, remote mount 14 could include dowel pins and cylinder head 102 could include dowel pin holes. Alternatively, ring dowels could be placed in counter-bored openings in one or more of openings 82 in a manner known in the art.

Figure 6:
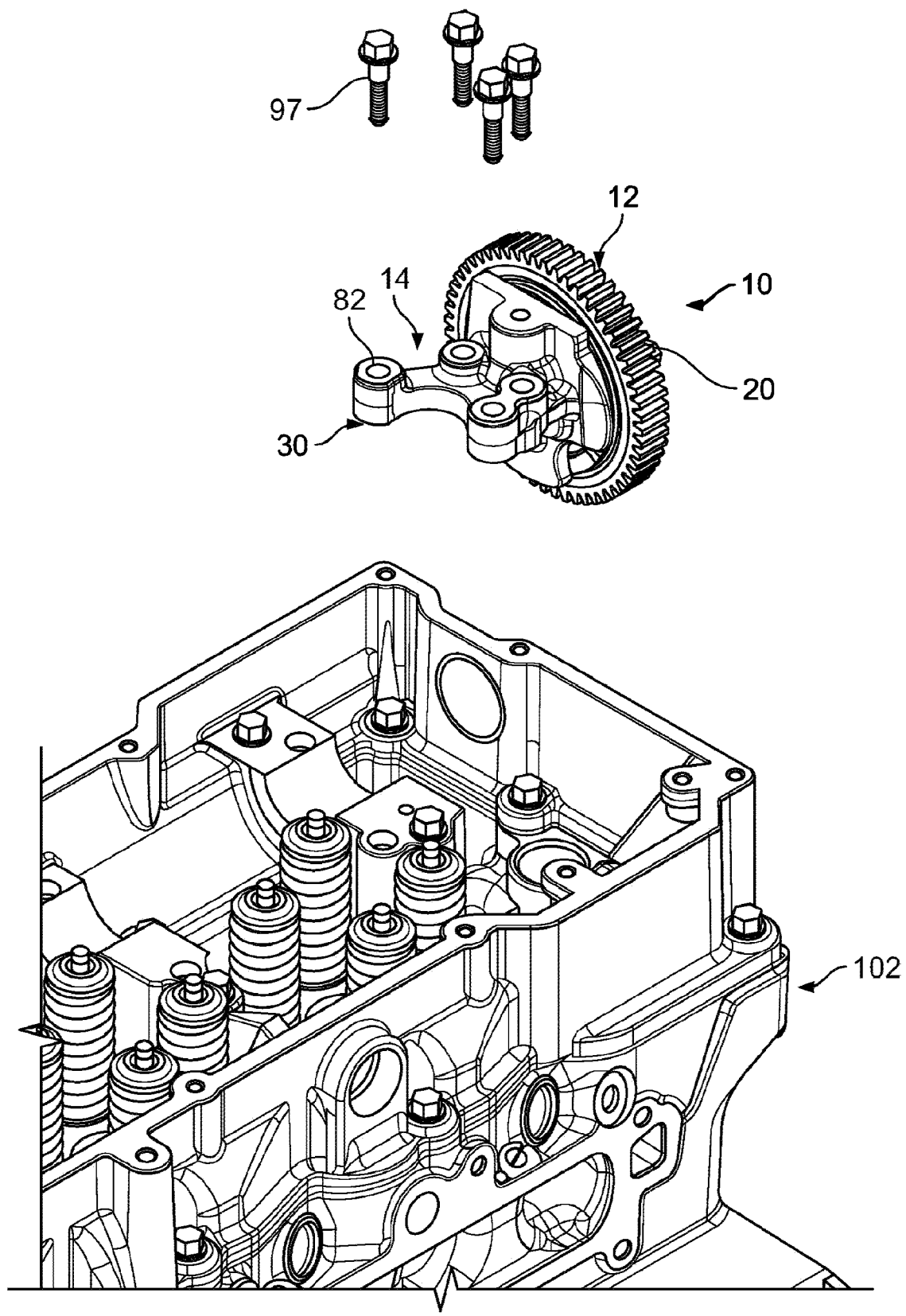
FIG. 6 is a perspective view of the idler gear assembly of FIG. 1 prior to installation onto a cylinder head.

FIG. 6 shows remote mount idler gear assembly 10 fully assembled and positioned for mounting to cylinder head 102. At this stage of assembly, fasteners 20 are finger tightened to attach gear assembly 12 to remote mount 14. This permits lash adjustment as is described below. Assembly 10 is placed onto an upper surface of cylinder head 102 such that dowel pins extending from the upper surface enter dowel pin holes 100 (FIG. 5) to precisely position remote mount 14 and therefore assembly 10. As such, lower surface 92 of attachment bracket 30 engages the upper surface of cylinder head 102 and, in certain embodiment, inner surface 74 is substantially perpendicular to lower surface 92 of attachment bracket 30. When properly positioned in this manner, the plane of inner surface 74 of mounting plate 28 is perpendicular to the axis of rotation of the crankshaft. Described another way, gear mounting plate 28 supports gear assembly 12 for rotation of gear 16 about an axis that is parallel to the axis of rotation of the crankshaft. Bolts 97 are then passed through openings 82 in attachment bracket 30 and threaded into threaded holes (not shown) that are formed into cylinder head 102. In certain embodiments, cylinder head 102 is modified to include the threaded holes in a pattern for mounting assembly 10. Bolts 97 are tightened per specifications to mount assembly 10 to cylinder head 102.

Figure 7:
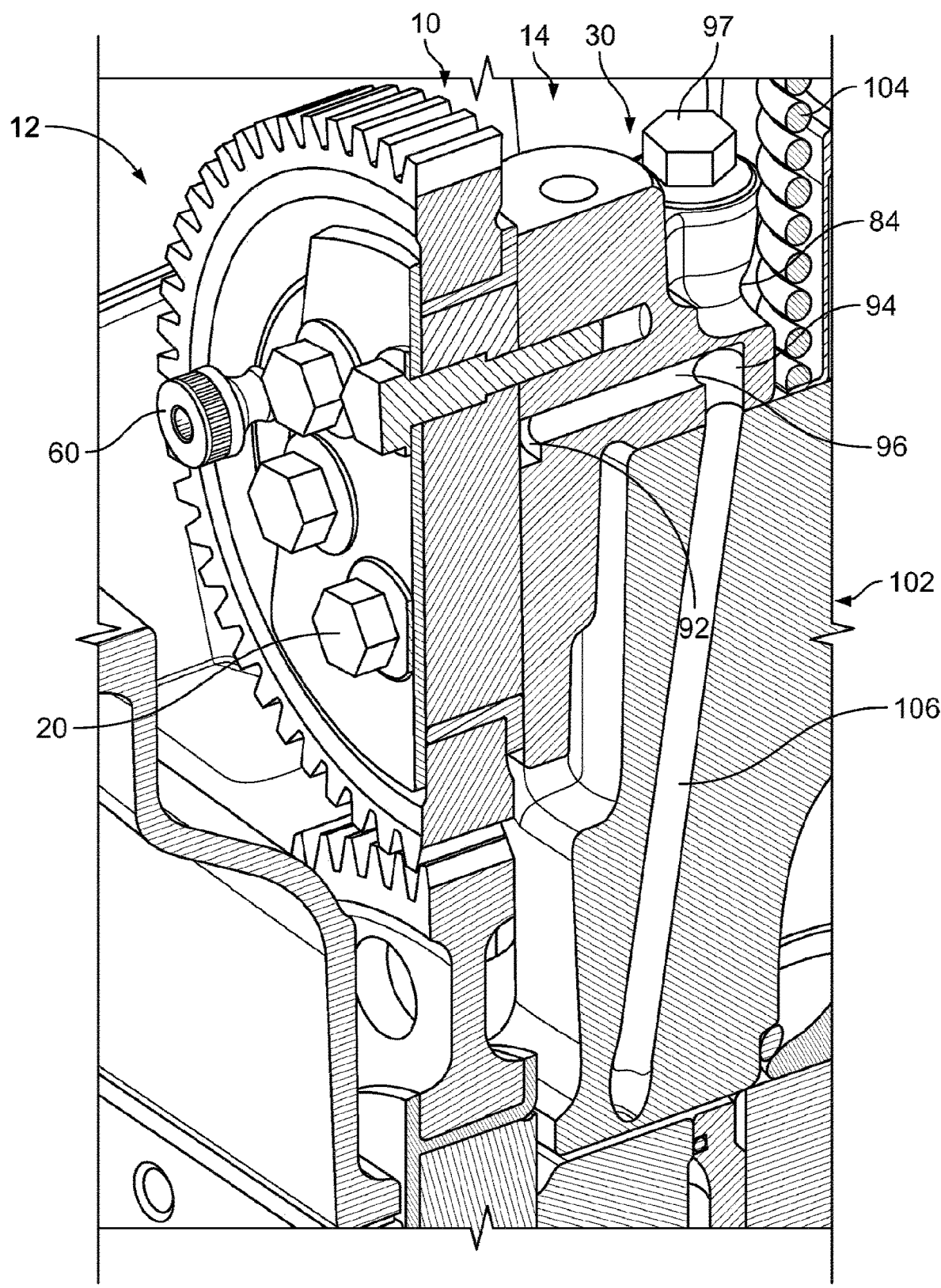
FIG. 7 is a cross-sectional view of the idler gear assembly of FIG. 1 installed onto a cylinder head.

FIG. 7 shows assembly 10 installed onto cylinder head 102. In the section shown, only one bolt 97 is visible. This view also depicts the cutout 84 on attachment bracket 30 and how it avoids interference with the valve spring 104. FIG. 7 also depicts the oil delivery drilling 106 in cylinder head 102 that communicates oil to drilling 94 of attachment bracket 30, which delivers the oil through drilling 96, out to slot 92 (also shown in FIG. 4).

Figure 8:
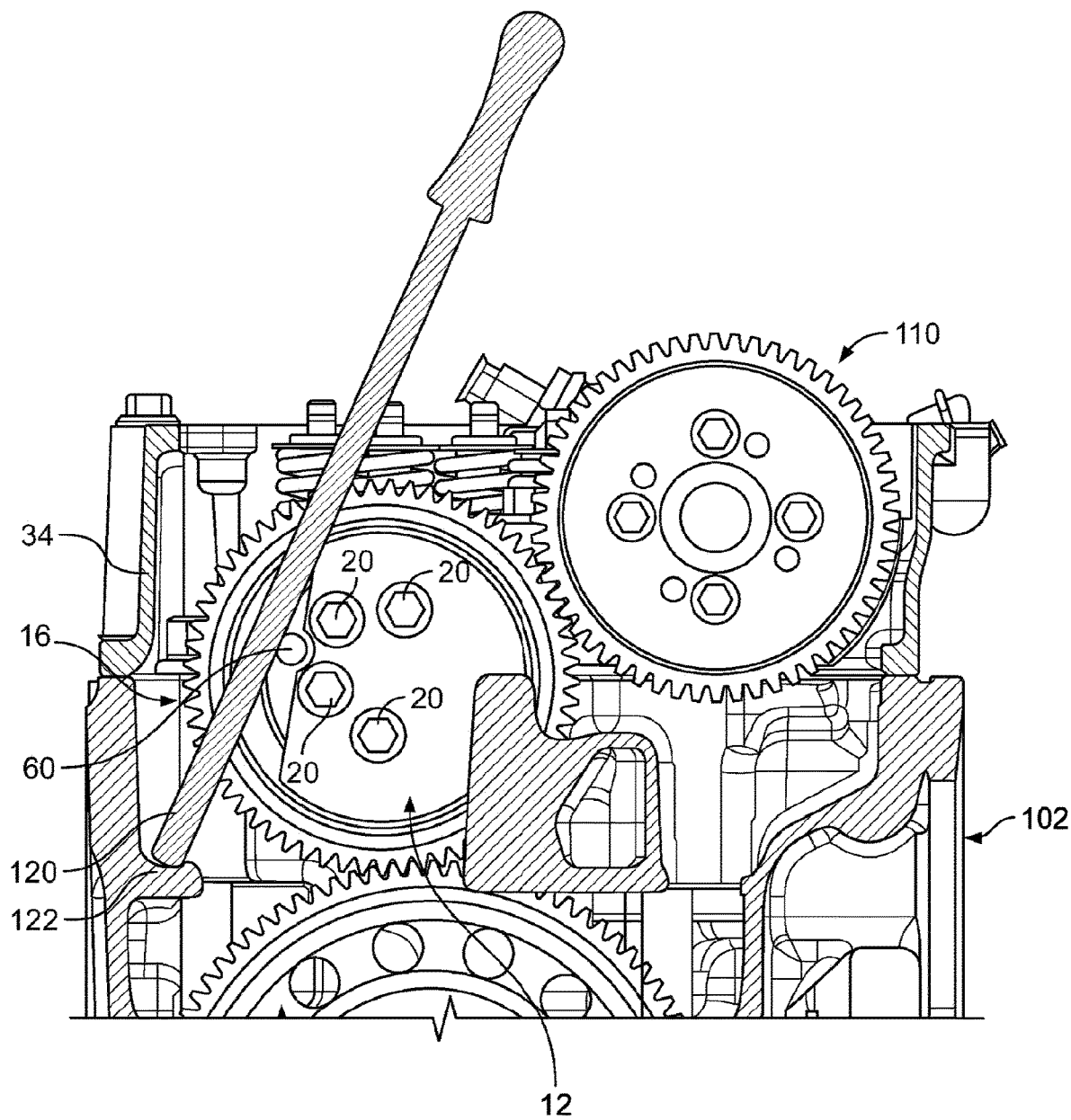
FIG. 8 is a side view of the idler gear assembly of FIG. 1 installed onto a cylinder head during a lash adjustment procedure.
Figure 9:
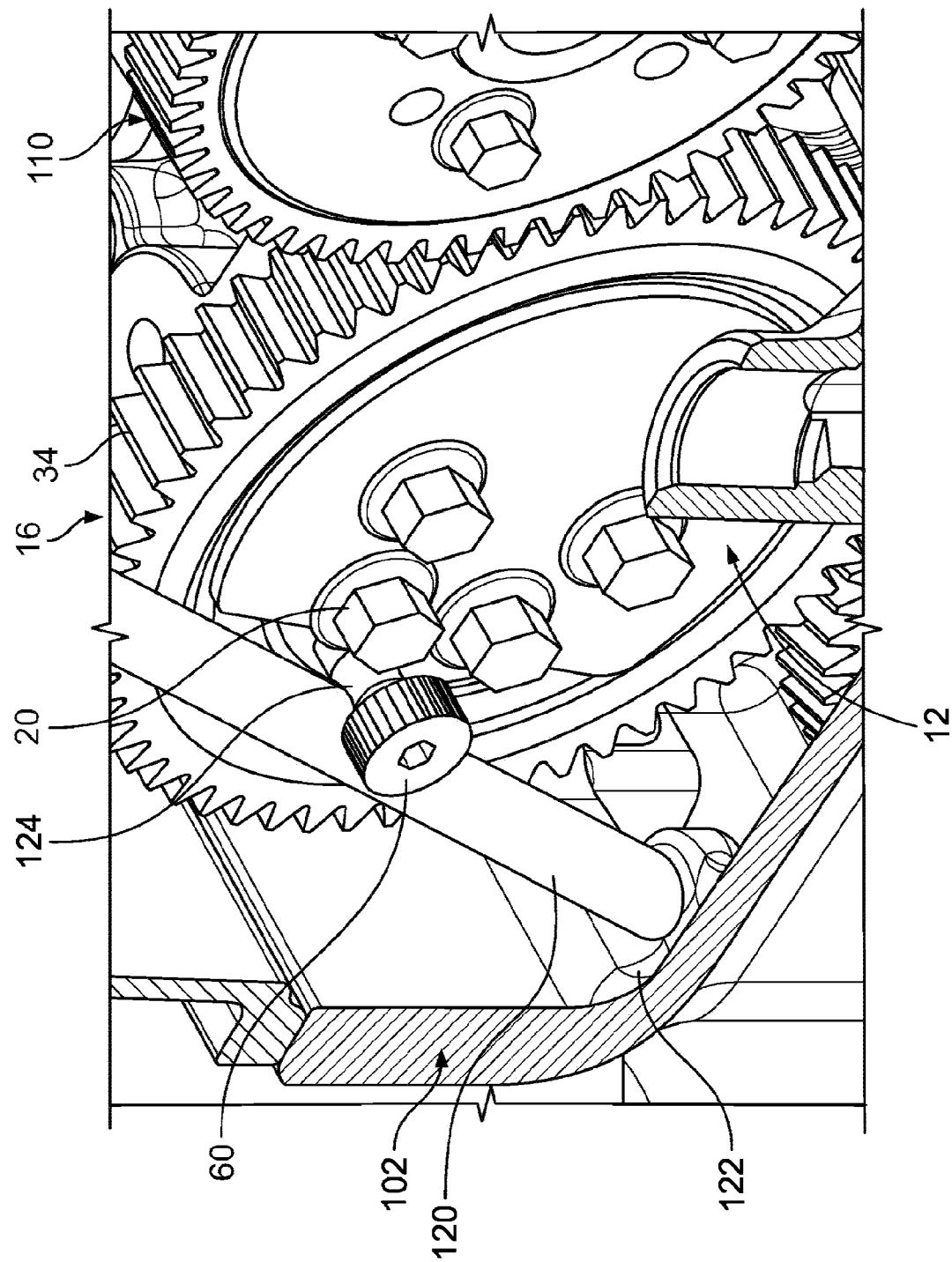
FIG. 9 is a perspective view of a portion of FIG. 8.
Figure 10:
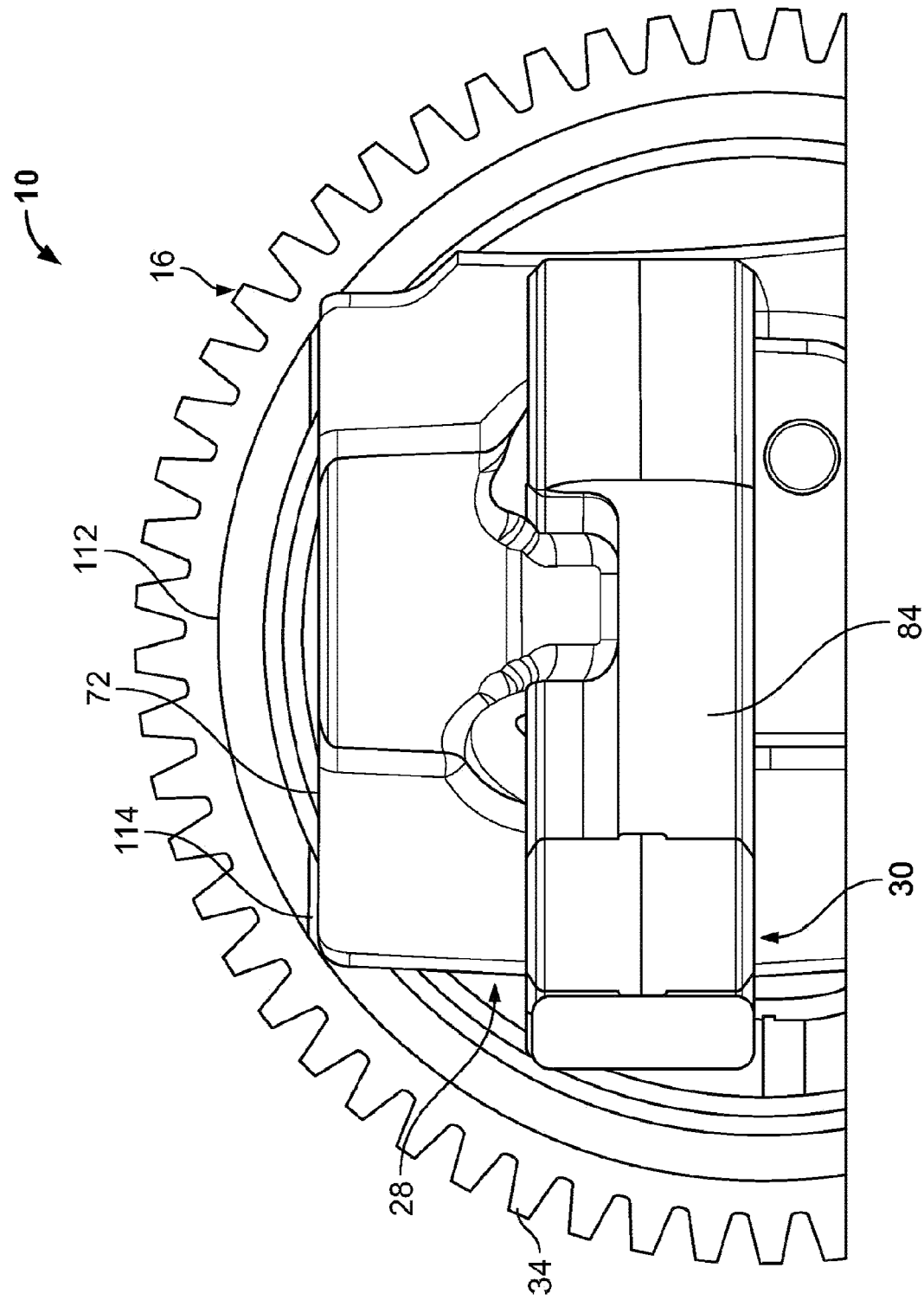
FIG. 10 is a side view of the idler gear assembly of FIG. 1 showing alignment of the gear.

Referring now to FIGS. 8-10, lash adjustment of gear assembly 10 is described. In these figures, assembly 10 is mounted to cylinder head 102 and teeth 34 of gear 16 interface with teeth of two adjacent gears, including a top block gear 108 and a cam gear 110. Top block gear 108 is driven by a crankshaft gear (not shown), which is driven by the engine crankshaft (not shown) as is known in the art. Prior to installation of assembly 10, the crankshaft is rotated to bring the piston of cylinder one of the engine to the top-dead-center position. As best shown in FIG. 10, when assembly 10 is installed, gear 16 is rotated first such that a "TOP" label 112 is positioned at the uppermost location of assembly 10 and timing marks 114 are aligned with the upper surface 72 of mounting plate 28. While gear 16 is depicted as having two timing marks 114, it should be understood that more or fewer timing marks may be used. Lash tape (not shown) is earlier installed onto the teeth 34 of gear 16 that mesh or interface with crank gear 108 and cam gear 110 when in the position shown in FIGS. 8 and 9. The lash tape ensures the proper amount of lash between the gear teeth upon installation and later disintegrates during operation of the engine. If gear 16 is rotated even by one tooth 34 in either direction relative to the proper interface with crank gear 108 and cam gear 110, then one of timing marks 114 is rotated behind mounting plate 28 and not visible. In certain embodiments, "TOP" label 112 and timing marks 114 are etched into gear 16 and used to ensure proper orientation of gear 16 during service operations.

When gear 16 is properly positioned, a lash adjustment tool (hereinafter, "rod 120") is placed into cylinder head 102 and seated onto a shoulder 122 formed therein. As best shown in FIG. 9, rod 120 also engages a scalloped surface 124 of bolt which provides a leverage point for rod 120. The upper end of rod 120 is moved in a clockwise direction as viewed in the figures to urge gear assembly 12 in an adjustment direction (i.e., to the right as viewed in the figures) to seat gear assembly 12 against cam gear 110 and crank gear 108 and achieve the desired lash. When gear assembly 12 is properly seated (i.e., the lash has been adjusted using rod 120) and with force still applied to rod 120, a fastener 20 is tightened per specifications to securely attach gear assembly 12 to remote mount 14. Rod 120 can then be removed and the remaining fasteners 20 tightened to secure gear assembly 12 to remote mount 14.

In summary, idler gear assembly 12 is installed onto an engine by first assembling idler gear assembly 12. The assembled idler gear assembly 12 is then mounted to gear mounting plate 28 of remote mount 14 using fasteners 20. At this point, fasteners 20 are only finger tight. Gear 16 is then rotated until timing parks 114 align with upper surface 72 of mounting plate 28. Attachment bracket 30 of remote mount 14 (with gear assembly 12 attached) is then bolted to an upper surface of cylinder head 102 as described above. This positions gear assembly 12 such that gear 16 rotates about an axis that is parallel to the axis of rotation of the crankshaft of the engine. The lash of the idler gear assembly is then adjusted using rod 120 in the manner described above. Finally, all of fasteners 20 are tightened to secure gear assembly 12 to mounting plate 28.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

We claim:

1. A remote mount for an idler gear assembly, comprising:
   a plurality of bores configured to receive a corresponding plurality of fasteners to mount a gear assembly to the remote mount; and
   a plurality of mounting openings configured to receive a corresponding plurality of bolts to mount the remote mount to a cylinder head;
   wherein the remote mount supports the gear assembly such that a gear of the gear assembly rotates about an axis that is parallel to an axis of a crankshaft of an engine and mounts to an upper surface of the cylinder head; and
   wherein the remote mount includes an inner surface into which the plurality of bores extend and includes a lower surface that engages the upper surface of the cylinder head, the inner surface being substantially perpendicular to the lower surface.

2. The remote mount of claim 1, wherein a slot is formed in the lower surface of the remote mount and configured to align with a drain opening in the cylinder head.

3. The remote mount of claim 1, wherein the remote mount further includes an inner surface having a slot in communication with a first drilling that extends through the remote mount and a second drilling that extends into the remote mount from the lower surface of the remote mount and is in flow communication with the first drilling, wherein the first drilling, the second drilling and the slot providing a path for oil to flow from the cylinder head to the gear assembly.

4. The remote mount of claim 1, wherein the remote mount includes a plurality of holes sized to receive pins extending from the cylinder head to control a position of the remote mount on the cylinder head.

5. The remote mount of claim 1, wherein the remote mount includes an upper surface that aligns with at least one timing mark on the gear to indicate a desired position of the gear.

6. The remote mount of claim 1, wherein the remote mount further includes an attachment bracket that is operatively connected to a hub and a gear mounting plate, wherein the gear mounting plate includes the plurality of bores configured to receive the corresponding plurality of fasteners to mount the idler gear assembly to the gear mounting plate, wherein the attachment bracket includes the plurality of mounting openings configured to receive the corresponding plurality of bolts to mount the remote mount to the cylinder head, and wherein each of the remote mount, the hub, and the gear mounting plate are discrete components.

7. A remote mount idler gear assembly, comprising: a gear assembly including a gear; and a remote mount, the remote mount including a plurality of bores configured to receive a corresponding plurality of fasteners to mount the gear assembly to the remote mount, wherein the remote mount includes a plurality of mounting openings each extending along an axis and being configured to receive a corresponding bolt to mount the remote mount to a cylinder head such that the remote mount is mounted internal to an engine; wherein the remote mount supports the gear assembly for rotation of the gear about an axis of rotation that is parallel to an axis of a crankshaft of the engine and the remote mount mounts to an upper surface of the cylinder head such that the axes of the mounting openings extend at an angle between, but not including, 0 degrees and 180 degrees relative to the axis of rotation of the gear remote mount supports the gear assembly such that a gear of the gear assembly rotates about an axis that is parallel to an axis of a crankshaft of an engine and mounts to an upper surface of the cylinder head; and wherein the remote mount includes an inner surface into which the plurality of bores extend and includes a lower surface that engages the upper surface of the cylinder head, the inner surface being substantially perpendicular to the lower surface.

8. The remote mount idler gear assembly of claim 7, wherein the gear assembly further includes a hub that supports the gear for rotation, the hub including a plurality of openings that are aligned with the plurality of bores in the remote mount and sized to permit adjustment of a position of the gear assembly on the remote mount to achieve a desired lash between the gear and an adjacent gear.

9. The remote mount idler gear assembly of claim 8, wherein the plurality of openings is sized to receive the corresponding plurality of fasteners with clearance to thereby permit adjustment of the position of the gear assembly on the remote mount to achieve the desired lash between the gear and the adjacent gear.

10. The remote mount idler gear assembly of claim 8, wherein the hub further includes a threaded opening to receive a lash adjustment bolt, the lash adjustment bolt providing a leverage point for a tool to urge the gear assembly in an adjustment direction during adjustment of the position of the gear assembly on the remote mount to achieve the desired lash.

11. The remote mount idler gear assembly of claim 8, wherein the remote mount further includes an attachment bracket that is operatively connected to the hub and a gear mounting plate, wherein the gear mounting plate includes the plurality of bores configured to receive the corresponding plurality of fasteners to mount the gear assembly to the gear mounting plate, wherein the attachment bracket includes the plurality of mounting openings configured to receive a plurality of bolts to mount the remote mount to the cylinder head, and wherein each of the remote mount, the hub, and the gear mounting plate are discrete components.

12. The remote mount idler gear assembly of claim 8, further comprising a thrust bearing that includes a generally ring-shaped body having a central opening, the thrusts bearing being configured to distribute oil across an inner surface of the thrust bearing to thereby lubricate rotational movement of the gear relative to the hub.

13. The remote mount idler gear assembly of claim 12, wherein the inner surface of the thrust bearing in fluid communication with a plurality of grooves or ramps extending across an inner surface of the generally ring-shaped body with which to distribute oil across the inner surface of the thrust bearing to thereby lubricate rotational movement of the gear relative to the hub.

14. The remote mount idler gear assembly of claim 7, wherein the remote mount includes a plurality of holes sized to receive pins extending from the cylinder head to control a position of the remote mount on the cylinder head.

15. The remote mount idler gear assembly of claim 7, wherein lash tape is coupled to teeth of the gear such that the lash tape ensures a proper amount of lash between the teeth of the gear upon installation; and
   wherein the lash tape disintegrates during operation of the engine.

16. A method of installing an idler gear assembly onto an engine, comprising:
   assembling the idler gear assembly;
   mounting the idler gear assembly to a remote mount using a plurality of fasteners;
   bolting the remote mount to an upper surface of a cylinder head of the engine, thereby positioning the idler gear assembly such that a gear of the idler gear assembly rotates about an axis that is parallel to an axis of a crankshaft of the engine;
   adjusting a lash of the idler gear assembly; and
   tightening the plurality of fasteners to secure the idler gear assembly to the remote mount.

17. The method of claim 16, wherein adjusting the lash of the idler gear assembly includes positioning a tool between a shoulder of the cylinder head and a scalloped surface of a lash adjustment bolt attached to a hub of the idler gear assembly and applying a force to the tool to urge the idler gear assembly into engagement with an adjacent gear.

18. The method of claim 17, further including maintaining the force while tightening a first fastener of the plurality of fasteners.

19. The method of claim 16, wherein mounting the idler gear assembly to the remote mount includes rotating the gear until at least one timing mark on the idler gear aligns with an upper surface of the remote mount.

20. The method of claim 16, further including installing lash tape onto teeth of a gear of the idler gear assembly such that the lash tape ensures a proper amount of lash between the teeth of the gear.

\* \* \* \* \*